Figure 1:
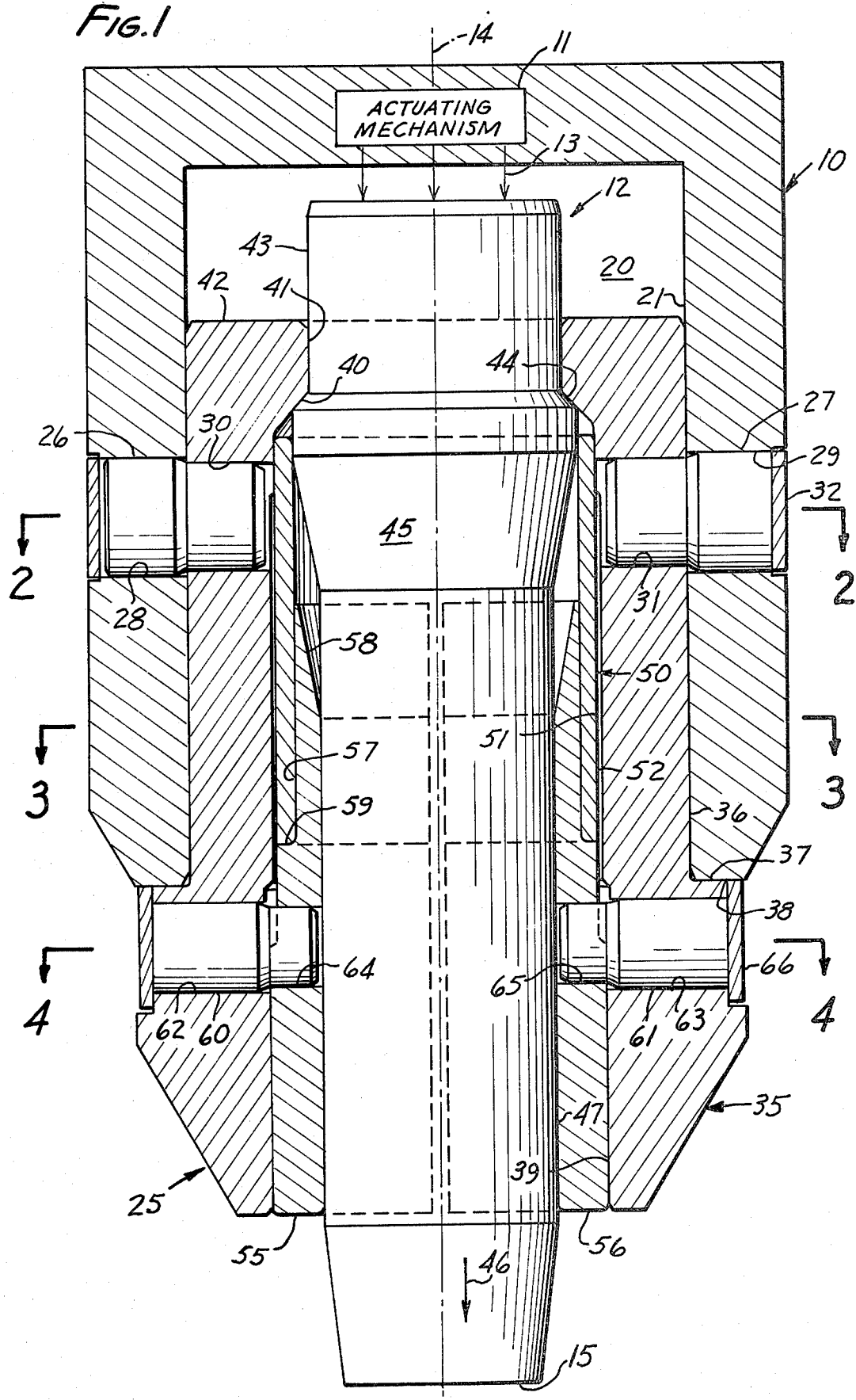

United States Patent [19]

Ottestad

[11] 4,222,462
[45] Sep. 16, 1980

[54] BRAKE TO DECELERATE AXIALLY MOVING ACTUATING ROD

[76] Inventor: Jack B. Ottestad, 1442 Muirlands Dr., La Jolla, Calif. 92037

[21] Appl. No.: 950,402

[22] Filed: Oct. 11, 1978

[51] Int. Cl.$^2$ ............................................. F16D 63/00
[52] U.S. Cl. ...................................... 188/67; 60/638; 92/85 A; 173/139; 188/84; 188/268; 188/271; 188/284; 267/137; 285/81; 403/316; 403/324; 403/379
[58] Field of Search ................. 188/67, 84, 129, 268, 188/271, 284; 74/531; 267/134, 137, 158; 92/85 R, 85 A; 403/316, 324, 379; 173/139; 285/81; 60/638

[56] References Cited

U.S. PATENT DOCUMENTS

| | | | |
|---|---|---|---|
| 1,609,136 | 11/1926 | Stevens | 173/139 X |
| 2,539,223 | 1/1951 | Bellek | 188/67 X |
| 2,845,908 | 8/1958 | Maier | 60/638 |
| 2,879,986 | 3/1959 | Maier | 92/85 R X |
| 3,086,501 | 4/1963 | Nielsen | 173/139 X |
| 3,566,978 | 3/1971 | Udert | 173/139 |

FOREIGN PATENT DOCUMENTS 10380  4/1909  France ...................... 188/129

Primary Examiner—George E. A. Halvosa
Attorney, Agent, or Firm—Donald D. Mon

[57] ABSTRACT

A brake to decelerate the driving movement of an actuating rod along an axis. The actuating rod is driven relative to a frame by an actuating mechanism. The actuating rod has an external tapered surface whose lateral dimension decreases in the direction in which it is driven. The brake includes a case attachable to the frame which contains within it a peripheral cylindrical brake band and a wedge member. The wedge member has an outer wall, and a tapered inside wall with substantially the same taper angle as the actuating rod. The wedge member and the brake member are disposed inside a passage in the case, with the brake band disposed between the case wall and the wedge member. There is a spacing between the wall of the passage and the outer wall of the brake band. The tapered inside wall is axially aligned with at least a portion of the inside wall of the brake band. When the tapered surface on the actuating rod enters the tapered inside wall, it presses the wedge member against the brake band and the resulting hoop-expansion of the brake band exerts a restraining force on the actuating rod so as to decelerate and arrest its motion.

9 Claims, 5 Drawing Figures

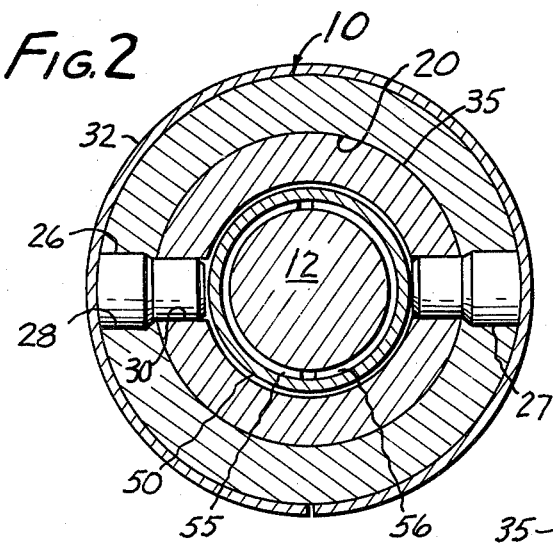
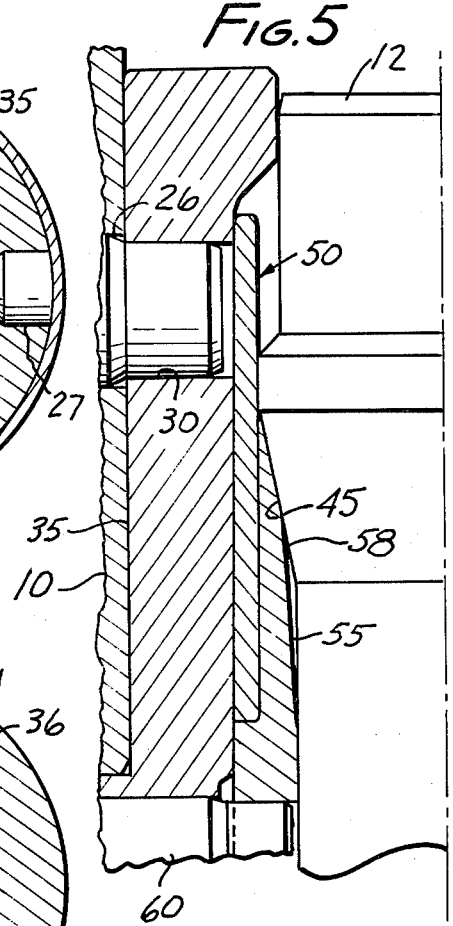
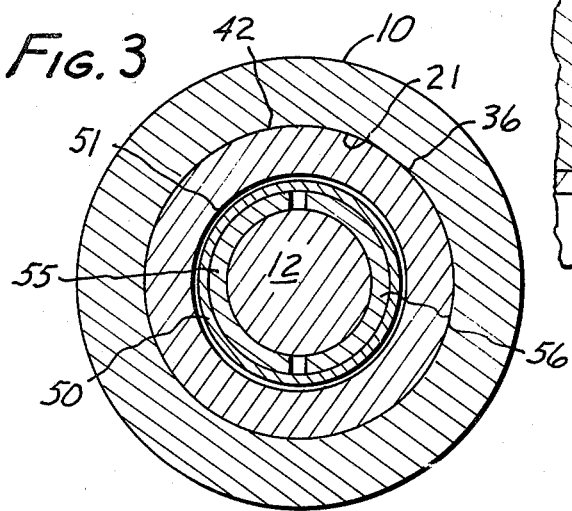
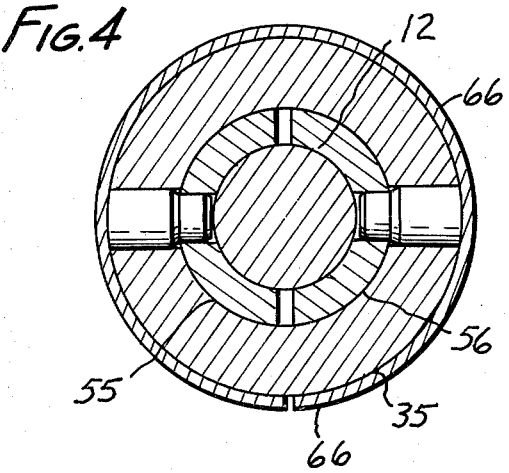

BRAKE TO DECELERATE AXIALLY MOVING ACTUATING ROD

This invention relates to impact-type machinery, and especially to a brake for decelerating the driving movement of an axially-moving actuating rod.

In the operation of impact equipment such as hammers and the like, it is customary for a large amount of energy to be transferred by an actuating rod which travels a very short distance. Examples of such devices are shown in Ottestand U.S. Pat. Nos. 3,363,513 and 4,111,269 issued Jan. 16, 1968 and Sept. 5, 1978, respectively.

There is little difficulty with such equipment so long as the energy of the actuating rod is dissipated into a surface against which it is directed, for example a mining seam, a pavement, or a heavy wall. However, occasionally the energy is not totally dissipated, or the rod is discharged in the air. Then the actuating rod will slam against the frame. Existing devices attend to this matter by providing long tie rods and other types of devices to resist these sharp forces, and these increase the size, weight and complexity of the mechanism. Because these mechanisms are frequently used in confined regions such as mines with low head room, this is undesirable.

It is an object of this invention to provide a brake for decelerating the driving movement of the actuating rod which is compact and reliable, and which does not materially extend the length of or materially add to the complexity of the device.

A brake according to this invention is used in combination with an actuating rod which has an external tapered surface whose lateral dimension decreases in the direction in which it is driven by the actuating mechanism. The brake itself comprises a case attachable to the frame. The case has an internal axial passage. A peripheral cylindrical brake band and a wedge member are placed inside the case passage, and the wedge member is restrained against axial movement. The wedge member has a tapered wall. The brake band is disposed between the wedge and the case, and there is a spacing between the case and the relaxed brake band. When the tapered surface of the actuating rod bears against the tapered wall of the wedge member it moves it laterally against the resistance of the brake band, and the resulting hoop-expansion of the brake band thereby exerts a braking effect on the actuating rod.

According to a preferred but optional feature of the invention, the wedge member is provided in the form of a pair of axially split half-cylindrical members.

The above and other features of this invention will be fully understood from the following detailed description and the accompanying drawings, in which:

FIG. 1 is an axial cross-section showing the presently preferred embodiment of the invention;

FIGS. 2, 3 and 4 are cross-sections taken at lines 2—2, 3—3 and 4—4, respectively, in FIG. 1; and FIG. 5 is a portion of FIG. 1 shown in another operating condition.

In FIG. 1 there is shown a frame 10 of a machine characterized by either of the aforesaid Ottestad applications. Such a frame commonly carries an actuating mechanism 11 such as shown in those patents which has as its objective to deliver a driving blow through an actuating rod 12. These forces are exemplified by arrows 13 and are exerted along an axis 14. It is characteristic of these actuating mechanisms that they store a substantial quantity of energy and release it to the actuating rod in a relatively short period of time so as to give a high acceleration with a high velocity thus to exert sharp impact on whatever is abutted.

It is also characteristic that a tool bit or other tool may be attached to the actuating rod to make the actual contact, but this is not necessary and the actuating rod itself can exert the driving blow if desired. The blow would be delivered by end 15 of the actuating rod or by the end of a tool attached thereto.

The frame has an opening 20 with an internal wall 21. The brake 25 is received in this opening and is held there by a pair of pins 26, 27 which are inserted through passages 28, 29 in the frame and 30, 31 in the brake. These pins are held in place by a peripheral retainer band 32 in the form of a snap ring. The brake is thereby insertable into the opening and is held there by the pins. It can be removed and replaced simply by removing the retainer band and pulling pins 26 and 27.

The brake itself includes a case 35 having an external wall 36 which makes a close fit with internal wall 21. It has a shoulder 37 which bears against lower end 38 of the frame. The case has a internal passage 39 with a sloping shoulder 40 and a cylindrical wall 41. A reduced neck passes a reduced portion 43 of the actuating rod. A sloping shoulder 44 on the actuating rod is dimensioned to interfere with sloping shoulder 40 on the brake to limit the upward movement of the actuating rod in the brake.

The actuating rod is provided with an external tapered surface 45 whose lateral dimension (diameter) decreases in the direction 46 in which it is driven by the actuating mechanism. In turn, the actuating rod has a longitudinal portion 47 which extends downwardly and out the bottom of the brake to exert a blow directly, or to be connected to a tool bit which will exert the blow.

A cylindrical brake band 50 is fitted inside the case. It extends fully peripherally around the axis. A spacing 51 is formed between the outer wall 52 of the brake band and the inside wall of the passage in the case. Two identical wedge members 55, 56 are placed between the longitudinal portion 47 and the brake band. Each wedge member is somewhat less than an axial one-half of a complete cylinder. Because they are identical, only wedge member 55 is described in detail. It has an outer wall 57. It also has a tapered inside wall 58. The taper need extend for only a portion of the length of the wedge member, and this portion should be aligned with the brake band. The outer wall has a step 59 on which the brake band rests. The outer walls 57 of the wedge members bear against the inside wall of the brake band. The taper of the tapered wall about matches the taper of external surface 45. The taper angles will be larger than those which define the cone of friction of the materials, so these surfaces can easily be parted. In fact, it is preferable that the angle be selected so they will be separated by the restoring spring force of the brake band. Therefore they should be above approximately 16° total included conical angle when the material is steel.

Another pair of retainer pins 60, 61 pass through the wall of passages 62, 63 in the wall of the case, and into passages 64, 65 in the wedge members to hold the wedge members against expulsion. A retainer band 66 is snapped around the case to hold the pins in place.

The operation of this device should be evident from an examination of FIGS. 1 and 5. In FIG. 1 the device is shown ready to deliver a blow. By means not disclosed here, but which can be learned from an examination of the said Ottestad patents, the actuating rod has been drawn upward and awaits the next blow. The actuating mechanism delivers a blow to it, and it begins immediately to move downwardly in FIG. 1. Should the force exerted by it be entirely dissipated in the object which it hits, tapered surface 45 may never reach tapered inside wall 58. There is no need to brake the actuating rod. If, however, the device were accidentally to have been discharged in the air, or against something which breaks before all of the energy has been dissipated, then the actuating rod must be stopped by the structure itself.

The braking action is shown in FIG. 5, wherein the actuating rod has moved far enough down that tapered surface 45 has pressed against tapered inside wall 58 and has cammed them outwardly against the brake band. This has expanded the brake band in hoop-tension. This quite substantial force will serve to decelerate and stop the actuating rod.

Then, because the conical taper angles are not within the cone of friction, the restoring force of the brake band squeezing on the wedge members will force the activating rod upwardly so it becomes free of the wedge members and can be retracted for the next cycle.

This device thereby absorbs substantial energy to bring the device to a halt. The heat generated will dissipate a substantial amount of energy.

The dimensions of the wedges, the angularity of the tapered sections, and the thickness and length of the brake band will be selected according to the extent of braking function required. Persons skilled in the art will have no difficulty in calculating the resistive forces required from the brake band for bringing the actuating rod to a halt.

The entire brake assembly is held together, and mounted to the actuating rod by pins which can readily be removed and replaced. This device thereby provides a simple, convenient, and readily serviceable decelerating device for impact tools.

This invention is not to be limited by the embodiment shown in the drawings and described in the description which is given by way of example and not of limitation, but only in accordance with the scope of the appended claims.

I claim:

1. A brake to decelerate the driving movement of the actuating rod of an impact device along an axis, said actuating rod being driven relative to a frame by an actuating mechanism, said actuating rod having an external tapered surface whose lateral dimension decreases in the direction in which it is driven by said actuating mechanism, said brake comprising:

a case attachable to said frame and having an internal axial passage;

a peripheral metal cylindrical brake band having an inner and an outer wall;

a rigid metal wedge member having an outer wall and a tapered inside wall with substantially the same taper angle as the actuating rod said wedge member comprising a plurality of axial segments of a cylindrical structure grouped in a circle inside said brake band so as to form a substantially complete ring and so the outer walls of said segments make substantially a surface-to-surface contact with the inner wall of said brake band;

means axially to restrain the wedge member to said case, said wedge member and said brake band being disposed inside said passage, with the brake band between the case wall and said wedge member, there being a spacing between the wall of said passage and the outer wall of said brake band, said tapered inside wall being axially aligned with at least a portion of said inside wall of the brake band, and in lateral interference with at least a portion of said external tapered surface of said actuating rod.

2. A brake according to claim 1 in which the taper angles lie outside the cone of friction.

3. A brake according to claim 1 in which said frame includes an axially extending opening with an internal wall, and with a plurality of laterally-extending passages therethrough, and in which said case has a plurality of aligned laterally-extending passages, and in which pins fit into said passages to hold said case to said frame.

4. A brake according to claim 1 in which each of said segments has a laterally extending passage therethrough, and in which said case has a first plurality of laterally-extending passages, one aligned with each of said passages in said segments, whereby to restrain said segments against axial movement.

5. A brake according to claim 4 in which said frame includes an axially extending opening with an internal wall, and with a plurality of laterally-extending passages therethrough, and in which said case has a second plurality of laterally-extending passages, and in which pins fit into said frame and second passages to hold said case to said frame.

6. A brake according to claim 5 in which the taper angles lie outside the cone of friction.

7. A brake according to claim 5 in which each of said segments includes a shoulder which laterally interferes with said brake band to restrain it against axial movement.

8. A brake according to claim 7 in which the taper angles lie outside the cone of friction.

9. A brake according to claim 7 in which a removable peripheral band encircles the frame to hold one set of pins in place, and another removable peripheral band encircles the case to hold the other set of pins in place.

* * * * *